(12) United States Patent
Kruglick

(10) Patent No.: US 9,699,058 B2
(45) Date of Patent: Jul. 4, 2017

(54) DATACENTER HEALTH ANALYSIS USING DNS SWITCHING

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilimington, DE (US)

( * ) Notice: Subject to any disclaimer, the term of this patent is extended or adjusted under 35 U.S.C. 154(b) by 0 days.

(21) Appl. No.: 14/238,457

(22) PCT Filed: May 13, 2013

(86) PCT No.: PCT/US2013/040745
§ 371 (c)(1),
(2) Date: Feb. 11, 2014

(87) PCT Pub. No.: WO2014/185889
PCT Pub. Date: Nov. 20, 2014

(65) Prior Publication Data
US 2015/0127816 A1    May 7, 2015

(51) Int. Cl.
*G06F 15/173* (2006.01)
*G06F 15/16* (2006.01)
(Continued)

(52) U.S. Cl.
CPC .......... *H04L 43/10* (2013.01); *H04L 43/0817* (2013.01); *H04L 43/0876* (2013.01); *H04L 43/50* (2013.01); *H04L 67/10* (2013.01)

(58) Field of Classification Search
CPC ........ G06F 2212/163; H04M 2242/40; H04M 3/42357; H04M 3/42374; H04N 21/237;
(Continued)

(56) References Cited

U.S. PATENT DOCUMENTS

2003/0187982 A1* 10/2003 Petit ........................ H04L 63/08
                                                             709/225
2006/0190602 A1*  8/2006 Canali ..................... H04L 29/06
                                                             709/226
(Continued)

OTHER PUBLICATIONS

"Amazon Route 53," Amazon Web Services, accessed at http://web.archive.org/web/20130509041826/http://aws.amazon.com/route53/, accessed on Jan. 22, 2014, pp. 1-5.
(Continued)

*Primary Examiner* — Melvin H Pollack
(74) *Attorney, Agent, or Firm* — Turk IP Law, LLC

(57) ABSTRACT

Technologies are generally described for monitoring application health in datacenters through load rebalancing. In some examples, a domain name server (DNS) module may cyclically vary load provided to an application instance. A monitoring module may then measure application output data and/or parameters associated with the processing of the load by the application based on a difference or a comparison between parts of the cyclical load variation. The monitoring module may use the measured data/parameters to both determine the health of the application instance and to cause the DNS module to adjust the periodic variation of the load.

20 Claims, 6 Drawing Sheets

(51) Int. Cl.
*H04L 12/26* (2006.01)
*H04L 29/08* (2006.01)

(58) Field of Classification Search
CPC ...... H04N 21/254; H04N 21/60; H04N 21/65; H04N 21/24; H04N 21/2404; H04N 21/2405; H04N 21/44209; H04N 21/647; H04L 29/08261; H04L 67/1029; G01T 1/169; G05B 2219/1214
USPC .......................................................... 709/224
See application file for complete search history.

(56) References Cited

U.S. PATENT DOCUMENTS

| | | | |
|---|---|---|---|
| 2011/0154073 A1* | 6/2011 | Wang | G06F 9/505 713/320 |
| 2011/0261055 A1 | 10/2011 | Wong et al. | |
| 2011/0270964 A1 | 11/2011 | Huang et al. | |
| 2012/0210416 A1 | 8/2012 | Mihelich et al. | |
| 2012/0297238 A1 | 11/2012 | Watson et al. | |
| 2013/0054929 A1 | 2/2013 | Baik et al. | |
| 2013/0185729 A1* | 7/2013 | Vasic | G06F 9/5072 718/104 |
| 2014/0136685 A1* | 5/2014 | Chan | H04L 41/142 709/224 |

OTHER PUBLICATIONS

"Creating Weighted Resource Record Sets," accessed at http://web.archive.org/web/20130530001754/http://docs.aws.amazon.com/Route53/latest/DeveloperGuide/WeightedResourceRecordSets.html, accessed on Jan. 22, 2014, pp. 1-3.

"Discussion Forums," accessed at https://forums.aws.amazon.com/thread.jspa?threadID=93630#, accessed on Jan. 22, 2014, pp. 1-2.

"DNS configuration in Google App Engine," accessed at http://web.archive.org/web/20101204053816/http://techblog.aasisvinayak.com/dns-configuration-in-google-app-engine/, accessed on Jan. 22, 2014, pp. 1-4.

"Graphite—Scalable Realtime Graphing," Graphite, accessed at http://web.archive.org/web/20130506234541/http://graphite.wikidot.com/, May 31, 2012, pp. 1-9.

"Nagios Is the Industry Standard in IT Infrastructure Monitoring," Nagios, accessed at http://web.archive.org/web/20130509092107/http://www.nagios.org/, accessed on Jan. 22, 2014, pp. 1-4.

"POST ChangeResourceRecordSets," accessed at http://docs.aws.amazon.com/Route53/latest/APIReference/API_ChangeResourceRecordSets.html, accessed on Jan. 22, 2014, pp. 1-11.

"Simple daemon for easy stats aggregation," GitHub, accessed at https://github.com/etsy/statsd/, accessed on Jan. 22, 2014, pp. 1-3.

"vSphere Client Hardware Health Monitoring," VMware Technical Note, pp. 1-10, VMware, Inc, Dec. 2010.

Eranki, R., "Scaling lessons learned at Dropbox, part 1," accessed at http://web.archive.org/web/20130401205138/http://eranki.tumblr.com/post/27076431887/scaling-lessons-learned-at-dropbox-part-1, Jul. 12, 2012, pp. 1-7.

Ghosh, G., et al., "Self-healing systems-survey and synthesis," Decision Support Systems, vol. 42, Issue 4, pp. 2164-2185, Elsevier B.V. Jan. 2007.

Holmes, D., "The Dynamic DNS Infrastructure," White Paper, pp. 1-16, F5 Networks, Inc., Feb. 2013.

Kaiser, G., et al., "An Approach to Autonomizing Legacy Systems," Workshop on Self-Healing, Adaptive and Self-MANaged Systems, pp. 6, Jun. 2002.

Kandula, S., et al., "The Nature of Data Center Traffic: Measurements & Analysis," Proceedings of the 9th ACM SIGCOMM Conference on Internet Measurement Conference, pp. 202-208, ACM, Nov. 2009.

Kephart, J.O., and Chess, D.M. "The Vision of Autonomic Computing," Computer, vol. 36, Issue 1, pp. 41-50, IEEE, Jan. 2003.

Losh, S., "Tracking Application-Level Metrics in Amara," Amara Labs, accessed at http://labs.amara.org/2012-07-16-metrics.html, Jul. 16, 2012, pp. 1-9.

McMillan, R., "Netflix to Open Source Army of Cloud Monkeys," Wired, accessed at http://web.archive.org/web/20130414123236/http://www.wired.com/wiredenterprise/2012/04/netflix_monkeys, Apr. 13, 2012, pp. 1-3.

Menascé, D.A., and Kephart, J.O "Autonomic Computing" IEEE Computer Society, vol. 11, No. 1, pp. 18-21, Jan. 2007.

Meng, S. et al., "Tide: Achieving Self-Scaling in Virtualized Datacenter Management Middleware," Proceedings of the 11th International Middleware Conference Industrial Track, pp. 17-22, ACM, Sep. 2010.

Miller, R., "NGINX Exec Talks about Netflix CDN Open Server Deal," Correlsense, accessed at hftp://web.archive.org/web/20130321073157/http://www.real-user-monitoring.com/nginx-exec-talks-about-netflix-cdn-open-server-deal, Jun. 8, 2012, pp. 1-4.

Moore, J., et al., "Data Center Workload Monitoring, Analysis, and Emulation," Eighth Workshop on Computer Architecture Evaluation Using Commercial Workloads, pp. 1-8 (2005).

International Search Report with Written Opinion for International Application No. PCT/US2013/040745 mailed on Dec. 3, 2013.

* cited by examiner

DATACENTER HEALTH ANALYSIS USING DNS SWITCHING

CROSS-REFERENCE TO RELATED APPLICATION

This application is the U.S. National Stage filing under 35 U.S.C. §371 of International Application Ser. No. PCT/US13/40745 filed on May 13, 2013. The International Application is hereby incorporated by reference in its entirety.

BACKGROUND

Unless otherwise indicated herein, the materials described in this section are not prior art to the claims in this application and are not admitted to be prior art by inclusion in this section.

With the continuing increase in the popularity of datacenters and cloud-based systems, commensurate increases in size and complexity of such systems may be expected. With system complexity growth, it may become more and more difficult for humans to handle system monitoring decisions, and automated system health monitoring and self-healing may become more desirable endeavors. However, evaluating complex datacenter configurations and server situations may be difficult. In particular, while system failures may be relatively easy to detect, it may be more difficult to detect systems that are about to fail. Moreover, although many monitoring systems use performance variations to determine system health, it may be difficult to separate performance variations due to system degradation from performance variations due to load variations.

SUMMARY

The present disclosure generally describes techniques for monitoring application health in datacenters.

According to some examples, a method is provided for monitoring application health in a datacenter. The method may include providing a cyclically varying load to an application instance to be processed by the application instance, monitoring application output data associated with the processing of the cyclically varying load by the application instance, determining a data parameter associated with the monitored application output data based on one of a difference or a comparison between parts of the cyclical load variation, adjusting the cyclically varying load based on the determined data parameter, and determining a health of the application instance based on the determined data parameter and the monitored application output data.

According to other examples, an application health monitoring module is provided for monitoring application health in a datacenter. The monitoring module may include a domain name server (DNS) modulation module and a processing module. The DNS modulation module may be configured to provide and adjust a cyclically varying load to an application instance at the datacenter to be processed by the application instance. The processing module may be configured to monitor application output data associated with the processing of the cyclically varying load by the application instance, determine a data parameter associated with the monitored application output data based on one of a difference or a comparison between parts of the cyclical load variation, cause the DNS modulation module to adjust the cyclically varying load based on the determined data parameter, and determine a health of the application instance based on the determined data parameter and the monitored application output data.

According to further examples, a cloud-based datacenter is provided for monitoring application health in a datacenter. The datacenter may include at least one virtual machine (VM) operable to be executed on one or more physical machines and a datacenter controller. The datacenter controller may be configured to provide a cyclically varying load to an application instance executing on the at least one VM to be processed by the application instance, monitor application output data associated with the processing of the cyclically varying load by the application instance, determine a data parameter associated with the monitored application output data based on one of a difference or a comparison between parts of the cyclical load variation, adjust the cyclically varying load based on the determined data parameter, and determine a health of the application instance based on the determined data parameter and the monitored application output data.

According to yet further examples, a computer readable medium may store instructions for monitoring application health in a datacenter. The instructions may include providing a cyclically varying load to an application instance to be processed by the application instance, monitoring application output data associated with the processing of the cyclically varying load by the application instance, determining a data parameter associated with the monitored application output data based on one of a difference or a comparison between parts of the cyclical load variation, adjusting the cyclically varying load based on the determined data parameter, and determining a health of the application instance based on the determined data parameter and the monitored application output data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
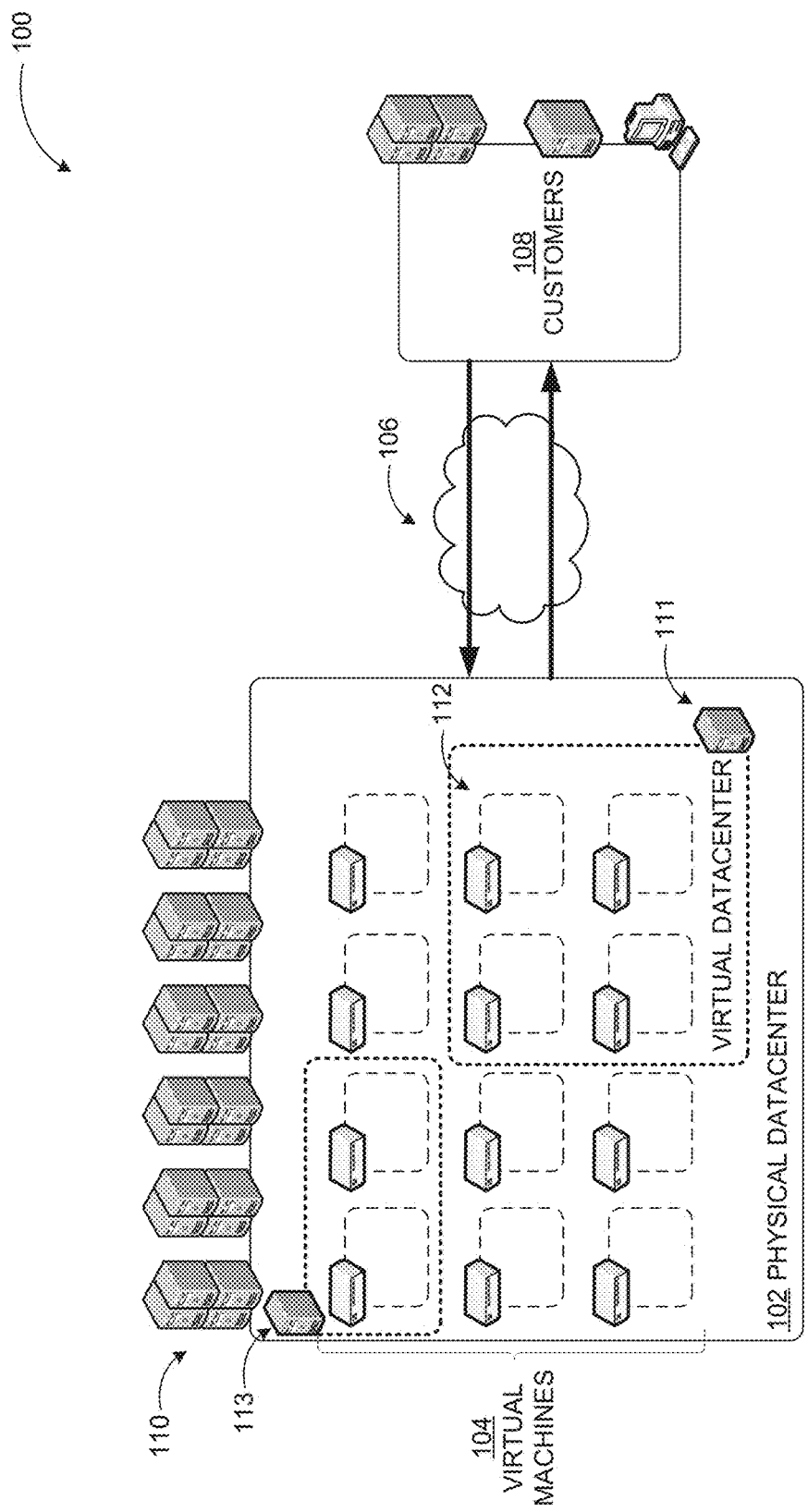
FIG. 1 illustrates an example datacenter-based system where techniques for monitoring application health may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and/or computer program products related to monitoring application health in datacenters.

Briefly stated, technologies are generally described for monitoring application health in datacenters through load rebalancing. In some examples, a domain name server (DNS) module may cyclically vary load provided to an application instance. A monitoring module may then measure application output data and/or parameters associated with the processing of the load by the application based on a difference or a comparison between parts of the cyclical load variation. The monitoring module may use the measured data/parameters to both determine the health of the application instance and to cause the DNS module to adjust the periodic variation of the load.

A datacenter as used herein refers to an entity that hosts services and applications for customers through one or more physical server installations and one or more virtual machines executed in those server installations. Customers of the datacenter, also referred to as tenants, may be organizations that provide access to their services by multiple users. An example datacenter based service configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations, where each service provider would execute their applications and have their users access those applications on the retail services own servers physically located on retail service premises. One result of the networked approach described herein is that customers like the retail service may move their hosted services/applications from one datacenter to another without the users noticing a difference.

FIG. 1 illustrates an example datacenter-based system where techniques for monitoring application health may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

According to some embodiments, a small and known oscillation may be imposed on load balancing (over existing fair or round-robin, for example) to generate differential monitoring data in two or more datacenter instances. Load balancing is a computer networking technique to distribute workload across multiple computers or a computer cluster, network links, central processing units, disk drives, or other resources, to achieve optimal resource utilization, maximize throughput, minimize response time, and avoid overload. Load balancing may be provided by dedicated software or hardware, such as a multilayer switch or a Domain Name System (DNS) server. In addition to dedicated hardware load balancers, software-only solutions may also be used to distribute appropriate computer tasks to multiple computers, so large tasks can be done more quickly. Datacenters may employ standardized and/or pre-packaged load balancing solutions or develop proprietary solutions. The datacenter instances may be within the same datacenter (e.g., as workers in a pool) or in two different datacenters. Thus, incoming load balancing may be varied by a small amount (e.g., a few percent) of load variation without meaningfully impacting the function of the worker instances, and performing a purposeful step oscillation with that load balancing may increase the number of equations available to extract the same number of unknown internal states of the monitored application. The incoming load variation may be dependent on application and load. For some applications, 1-2% may be plenty. Others may need 10% or more for good data. In general, the variation may have to be lower the higher utilization is. The DNS square wave modulation, which may be accomplished with available API calls resetting weightings to the DNS load balancer, may be sent from the monitoring system without upsetting any other functionality in the datacenter(s). The analysis may be performed by taking an average and a difference of the monitoring data at the high and low point of each modulation step to provide two separate health signals offering base and incremental measurements that may provide the needed accuracy.

Figure 2:
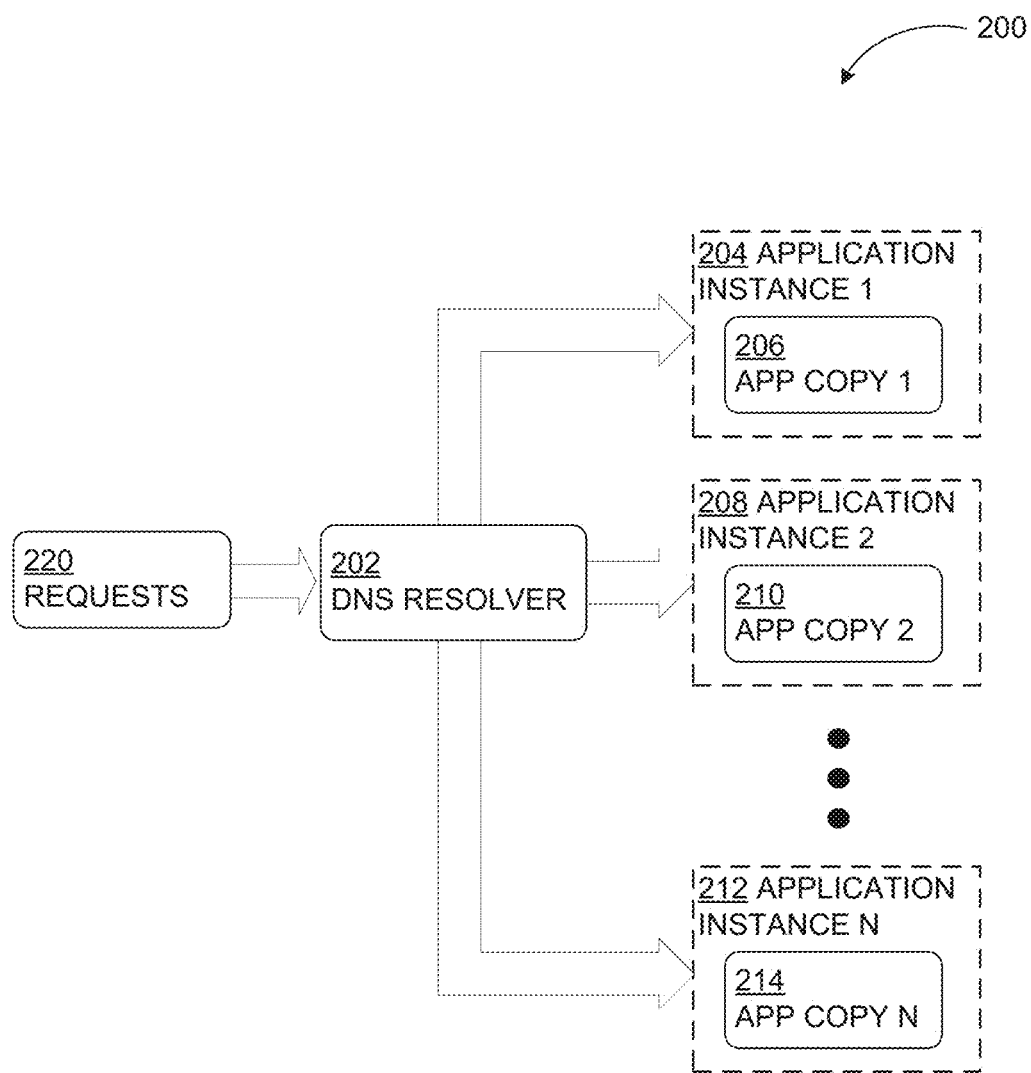
FIG. 2 illustrates an example datacenter-based system having multiple application instances.

FIG. 2 illustrates an example datacenter-based system having multiple application instances, arranged in accordance with at least some embodiments described herein.

A cloud-based application may be hosted by one or more datacenters, such as the physical datacenter 102 described above, and may in actuality be implemented as multiple copies or instances of the application. As shown in a diagram 200, a particular application may be provided as multiple application instances, each implementing a copy of the application. For example, an application instance 1 204 may implement an application copy 1 206, an application instance 2 208 may implement an application copy 2 210, and an application instance N 212 may implement an application copy N 214. All of the application instances may reside at the same physical datacenter, or they may be distributed among different datacenters.

The different application instances 204, 208, and 212 may be coupled to a domain name server (DNS) resolver 202. In some embodiments, the DNS resolver 202 may receive incoming requests 220 for the application and subsequently distribute the requests 220 among the different application instances 204, 208, and 212. The distribution may provide ease of load balancing (i.e., the DNS resolver 202 may divert requests from more heavily-loaded application instances to other application instances) and allow application instance copies to be easily switched on, switched off, or migrated. In some embodiments, the DNS resolver 202 may distribute the incoming requests 220 to the application instances 204, 208, and 212 in a round-robin selection process, where individual requests are routed to the application instances according to a specified order. For example, the DNS resolver 202 may route a first incoming request to the first application instance 204, a second incoming request to the second application instance 208, and so on. After routing the Nth incoming request to the Nth application instance 212, the DNS resolver may repeat the cycle by routing the next (N+1) incoming request to the first application instance 204 again. In some embodiments, the DNS resolver may use a weighted round-robin selection process to distribute the incoming requests 220. The weighted round-robin process may be similar to the round-robin process described above, with the exception that some application instances may receive more incoming requests than others. For example, while the DNS resolver 202 may route the first incoming request to the first application instance 204, it may route the next two incoming requests to the second application instance 208 instead of only the next one incoming request.

As mentioned above, it may be difficult to separate performance variations due to system degradation from performance variations due to load variations. Input load modulation may be used to address this issue. For example, input loads between different application instances may be switched in a known manner (e.g., by using a DNS resolver as described above). Performance variations due to load variations may then track the known switching pattern, whereas performance variations due to system degradation may not track the known switching pattern. As a result, the effect of load variation (based on the known input switching) may be separated from the effect of system degradation, which may be independent of the known input switching.

Figure 3:
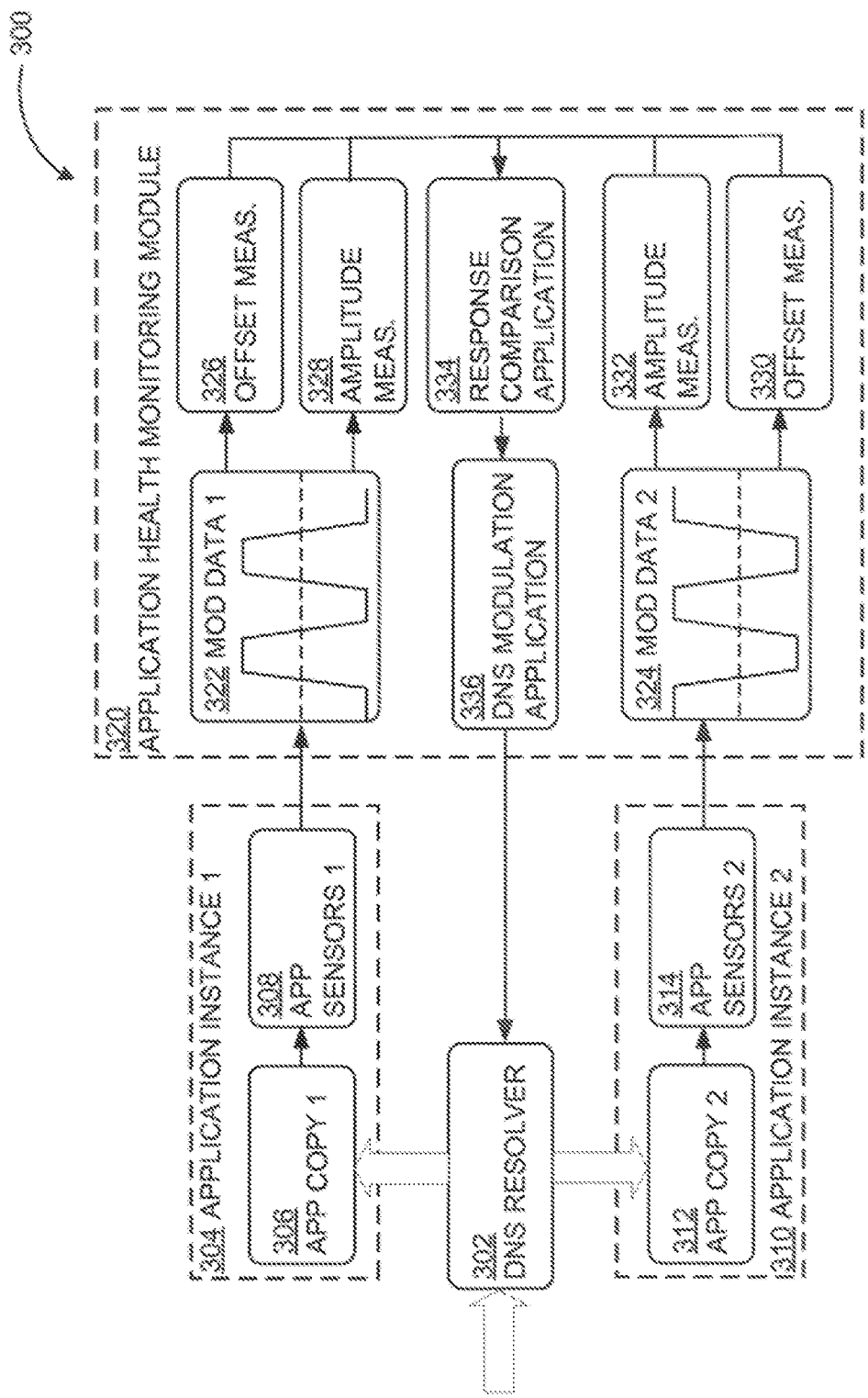
FIG. 3 illustrates an example datacenter-based system having multiple application instances and an application health monitoring module.

FIG. 3 illustrates an example datacenter-based system having multiple application instances and an application health monitoring module, arranged in accordance with at least some embodiments described herein.

As shown in a diagram 300, a DNS resolver 302 (similar to the DNS resolver 202) may route incoming requests to an application copy 1 306 implemented in an application instance 1 304 and an application copy 2 312 implemented in an application instance 2 310. The DNS resolver 302 may route incoming requests based on instructions from a DNS modulation application 336. For example, the DNS modulation application 336 may instruct the DNS resolver 302 to route incoming requests in a round-robin or weighted round-robin fashion (as described above), or in any other suitable manner.

In some embodiments, the DNS modulation application 336 may instruct or cause the DNS resolver 302 to vary the proportion or number of incoming requests routed to the two application copies 1 306 and 2 312 over time, thereby diverting load to and from the different application copies. For example, the DNS modulation application 336 may instruct the DNS resolver 302 to route 50% of the incoming requests to the application copy 1 306 and 50% to the application copy 2 312 at a first time. Subsequently, at a second time, the DNS modulation application 336 may instruct the DNS resolver 302 to route 48% of the incoming requests to the application copy 1 306 and 52% to the application copy 2 312. Then, at a third time, the DNS modulation application 336 may instruct the DNS resolver 302 to route 51% of the incoming requests to the application copy 1 306 and 49% to the application copy 2 312. As another example, the DNS modulation application 336 may instruct the DNS resolver 302 to route 10 of the incoming requests to the application copy 1 306 and the remainder to the application copy 2 312 at a first time. Subsequently, at a second time, the DNS modulation application 336 may instruct the DNS resolver 302 to route 8 of the incoming requests to the application copy 1 306 and the remainder to the application copy 2 312. In some embodiments, the load/request variation may be periodic in nature, taking the form of oscillations. The DNS modulation application 336 may determine the exact load/request distribution based on analysis of measured output data from the application copy 1 306 and the application copy 2 312, as discussed in more detail below.

Each of the application instances may include one or more application sensors for measuring data associated with operation of the associated applications. For example, the application instance 1 304 may include application sensors 1 308 configured to measure data associated with operation of the application copy 1 306. Similarly, the application instance 2 310 may include application sensors 2 314 configured to measure data associated with operation of the application copy 2 312. The measured data may include operating information such as application power consumption, application memory usage, and the like. Application sensors may include VMM based sensors, agent-based sensors, operating system instrumentation, application code that emits diagnostic information, and comparable ones.

The application sensors may then provide the measured operation data to an application health monitoring module 320. For example, the application sensors 1 308 may provide modulated data 1 322, and the application sensors 2 314 may provide modulated data 2 324. The provided data may be modulated due to the load variations caused by the DNS resolver 302 in response to instructions from the DNS modulation application 336, as described above. For example, suppose the DNS modulation application 336 instructs the DNS resolver 302 to route fewer requests (either numerically or proportionally) to the application copy 1 306 at a second time than at a first time. Since the application copy 1 306 may perform less processing at the second time compared to the first time, the modulated data 1 322 may reflect lower power consumption and/or memory usage for the application copy 1 306 at the second time compared to the first time.

The application health monitoring module 320 may then process the received modulated data 1 322 and modulated data 2 324 to determine output data reflecting the operation of the application copy 1 and the application copy 2 312 over time. For example, the application health monitoring module 320 may process the modulated data 1 322 to determine an offset measurement 326 and an amplitude measurement 328 associated with the operation of the application copy 1 306. Similarly, the application health monitoring module 320 may process the modulated data 2 324 to determine an offset measurement 330 and an amplitude measurement 332 associated with the operation of the application copy 2 312. In situations where the loads/requests provided to the application copies have been varied cyclically (as described above periodically or with some dithering so that the variation is aperiodic but cyclical), the offset measurements 326 and 330 may be related to the baseline or average value of the modulated data 1 322 and 2 324. The variation of the load may also be open loop (e.g., applied at the same amplitude without adjustment based on determined data parameter). The amplitude measurements 328 and 332 may be related to the difference between maximum and minimum values (or between the baseline value and the maximum or minimum values) of the modulated data 1 322 and 2 324.

Subsequently, a response comparison application or module 334 may compare the offset measurements 326 and 330 and the amplitude measurements 328 and 332 with each other. For example, the offset measurement 326 may be compared with the offset measurement 330 and the amplitude measurement 328 may be compared with the amplitude measurement 332. The response comparison application 334 may perform the comparison to evaluate the health of the application copy 1 306 and/or the application copy 2 312. In some embodiments, the amplitude measurements 328 and 332 may reflect processing variations due to load/request variations, and the offset measurements 326 and 330 may reflect processing variations due to the health of the specific applications. Therefore, if the offset measurements 326 and 330 do not correspond to each other and/or to the average loads of the application copy 1 306 and the application copy 2 312, one or both of the application copies may be degraded and close to failure. For example, suppose that the modulated data 1 322 and modulated data 2 324 include memory usage data, and the offset measurements 326 and 330 indicate the rate of change of memory usage in the two application copies 1 306 and 2 312. Memory usage, and especially the rate of change of memory change, may be indicative of application degradation. As an application degrades, memory leaks may become more prevalent, and its memory usage may increase independent of load. As the application degrades, the rate of change of the memory usage may increase. So, if the rate of change of memory usage for the application copy 1 306 is increasing with respect to the rate of change of memory usage for the application copy 2 312, the application copy 1 306 may be more degraded than the application copy 2 312. In some embodiments, the response comparison application 334 may instead (or in addition) compare the offset measurements 326/330 and/or the amplitude measurements 328/332 with one or more other predefined thresholds or perform various other analyses on them using derivatives, integrals, averages, process control with limits, machine classification, and so on. For example, a predefined threshold may be provided that indicates whether an application is degraded or close to failure. If a corresponding measurement does not meet that predefined threshold, then the application instance associated with that measurement may be considered degraded or close to failure. In this situation, the application health monitoring module 320 or another datacenter application/module may shut down or restart the degraded application instance.

The application health monitoring module 320 may optionally use the results from the response comparison application 334 to instruct the DNS modulation application 336 and the DNS resolver 302 to modify the incoming load/request variations based on the results of the comparison, as mentioned above. For example, the application health monitoring module 320 may cause the proportion of the incoming requests that are diverted to one application copy to be modified (e.g., 48%/52% instead of 49%/51%) or the number of requests diverted to one application copy to be modified. The application health monitoring module 320 may cause the incoming load/request variations to be adjusted if it is unable to determine the health of one or both of the application copies, or as part of a monitoring routine.

In some embodiments, the application health monitoring module 320 may also adjust the frequency of a cyclically varying load provided to the application copy 1 306 and/or the application copy 2 312. For example, specific service issues may be associated with specific variation frequencies. Datacenter/network congestion may be associated with one frequency, memory leakage may be associated with another frequency, and application programming interface (API) call conflicts may be associated with yet another frequency. The application health monitoring module 320 may, therefore, adjust the frequency of the load by chirping the frequency through a range include these frequencies of interest.

While only two application instances are depicted in FIG. 3, in other embodiments the DNS resolver 302 and the application health monitoring module 320 may be coupled to three or more application instances as well. The application health monitoring processes described herein are also applicable in these situations.

Figure 4:
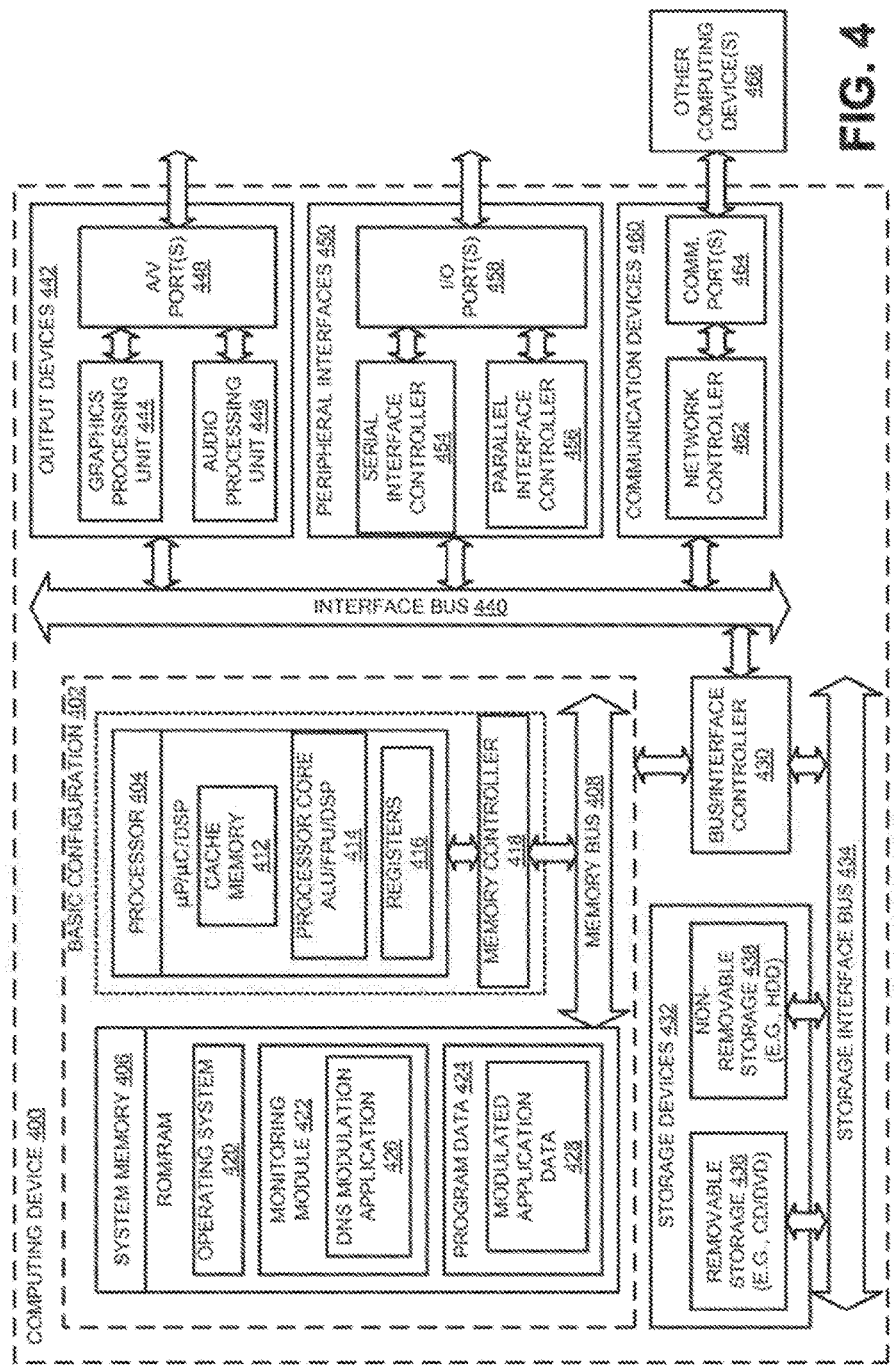
FIG. 4 illustrates a general purpose computing device, which may be used to monitor application health in a datacenter.

FIG. 4 illustrates a general purpose computing device, which may be used to monitor application health in a datacenter, arranged in accordance with at least some embodiments described herein.

For example, the computing device 400 may be used to monitor application health as described herein. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one or more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to, volatile memory (such as RAM), non-volatile memory (such as ROM, flash memory, etc.) or any combination thereof. The system memory 406 may include an operating system 420, a monitoring module 422, and program data 424. The monitoring module 422 may include a domain name service (DNS) modulation application 426 for adjusting application instance load as described herein. The program data 424 may include, among other data, modulated application data 428 or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 450, and one or more communication devices 460) to the basic configuration 402 via the bus/interface controller 430. Some of the example output devices 442 include a graphics processing unit 444 and an audio processing unit 446, which may be configured to communicate to various external devices such as a display or speakers via one or more A/V ports 448. One or more example peripheral interfaces 450 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 462, which may be arranged to facilitate communications with one or more other computing devices 466 over a network communication link via one or more communication ports 464. The one or more other computing devices 466 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for monitoring application health in datacenters through DNS switching. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 5:
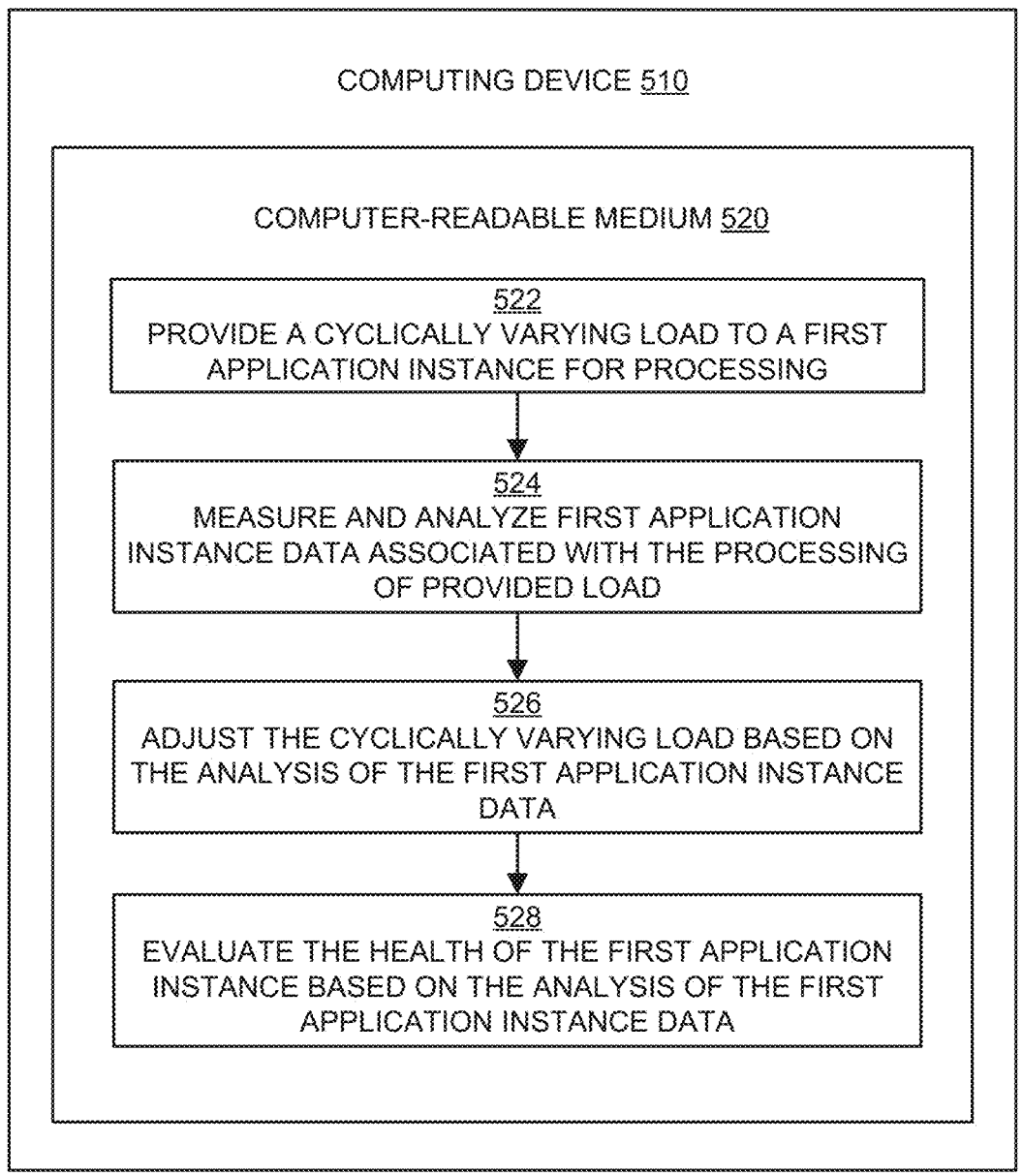
FIG. 5 is a flow diagram illustrating an example method for monitoring application health in datacenters that may be performed by a computing device such as the computing device in FIG. 4.

FIG. 5 is a flow diagram illustrating an example method for monitoring application health in datacenters that may be performed by a computing device such as the computing device in FIG. 4, arranged in accordance with at least some embodiments described herein.

Example methods may include one or more operations, functions or actions as illustrated by one or more of blocks 522, 524, 526, and/or 528, and may in some embodiments be performed by a computing device such as the computing device 400 in FIG. 4. The operations described in the blocks 522-528 may also be stored as computer-executable instructions in a computer-readable medium such as a computer-readable medium 520 of a computing device 510.

An example process for monitoring application health in datacenters may begin with block 522, "PROVIDE A CYCLICALLY VARYING LOAD TO A FIRST APPLICATION INSTANCE FOR PROCESSING", where a portion of incoming requests to an application may be routed to a first instance of the application by, for example, a DNS resolver such as the DNS resolver 302 described above. The DNS resolver may vary the number of requests routed to the first application instance as a function of time, and may do so based on instructions from a DNS modulation application (e.g., the DNS modulation application 336), as described above.

Block 522 may be followed by block 524, "MEASURE AND ANALYZE FIRST APPLICATION INSTANCE DATA ASSOCIATED WITH THE PROCESSING OF PROVIDED LOAD", where an application health monitoring module (e.g., the application health monitoring module 320) may analyze data from the first application instance associated with processing of the cyclically varying load. The data may be collected by application sensors (e.g., the application sensors 1 308), and may be processed by the application health monitoring module as described above.

Block 524 may be followed by block 526, "ADJUST THE CYCLICALLY VARYING LOAD BASED ON THE ANALYSIS OF THE FIRST APPLICATION INSTANCE DATA", where the application health monitoring module may cause the DNS resolver to adjust the number, frequency, and/or proportion of incoming requests routed to the first application instance based on its analysis, as described above.

Finally, block 526 may be followed by block 528, "EVALUATE THE HEALTH OF THE FIRST APPLICATION INSTANCE BASED ON THE ANALYSIS OF THE FIRST APPLICATION INSTANCE DATA", where the application health monitoring module may use its analysis of the first application instance data to determine whether the first application instance is suffering degradation or close to failure, as described above.

Figure 6:
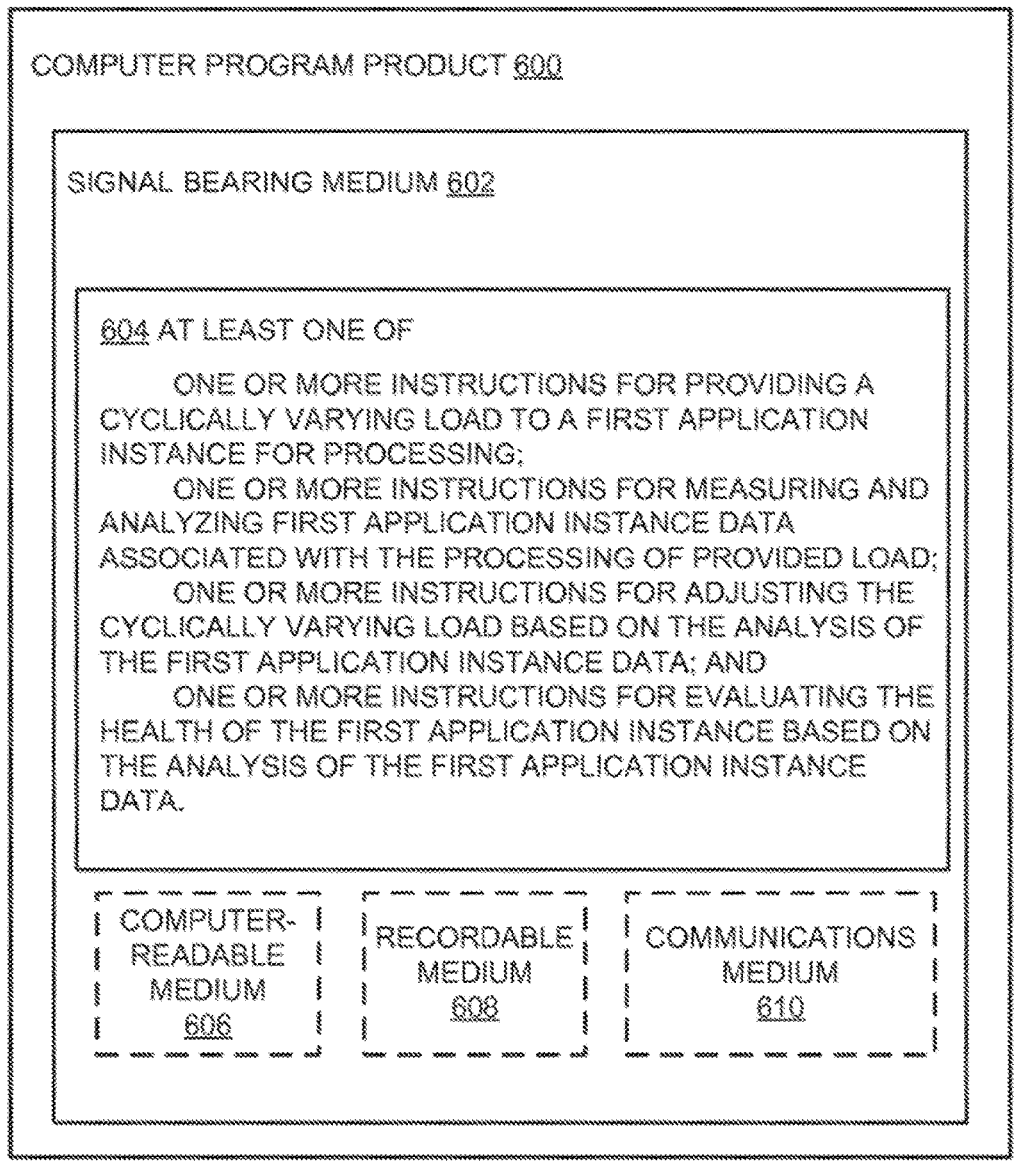
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, the monitoring module 422 may undertake one or more of the tasks shown in FIG. 6 in response to the instructions 604 conveyed to the processor 404 by the signal bearing medium 602 to perform actions associated with monitoring application health as described herein. Some of those instructions may include, for example, providing a cyclically varying load to a first application instance for processing, measuring and analyzing first application instance data associated with the processing of the provided load, adjusting the cyclically varying load based on the analysis of the first application instance data, and/or evaluating the health of the first application instance based on the analysis of the first application instance data, according to some embodiments described herein.

In some implementations, the signal bearing medium 602 depicted in FIG. 6 may encompass a computer-readable medium 606, such as, but not limited to, a hard disk drive (HDD), a solid state drive (SSD), a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, a method for monitoring application health in a datacenter may include providing a cyclically varying load to an application instance to be processed by the application instance, monitoring application output data associated with the processing of the cyclically varying load by the application instance, determining a data parameter associated with the monitored application output data based on one of a difference or a comparison between parts of the cyclical load variation, adjusting the cyclically varying load based on the determined data parameter, and determining a health of the application instance based on the determined data parameter and the monitored application output data.

According to some embodiments, the method may further include providing and adjusting the cyclically varying load by redistributing application requests from a domain name server (DNS) resolver. The application output data may include a processing variation offset and/or a processing variation amplitude associated with the processing of the cyclically varying load by the application instance. The data parameter may include a rate of change of a memory usage associated with the application instance.

According to other embodiments, the method may further include adjusting the cyclically varying load by diverting load to or diverting load from another application instance and/or selecting the other application instance from multiple application instances using a round-robin or weighted round-robin selection process. The method may further include determining the health of the application instance by comparing the determined data parameter to a predefined threshold and/or shutting down or restarting the application instance in response to a determination that the data parameter does not meet the predefined threshold.

According to further embodiments, the method may further include determining the health of the application instance by comparing the determined data parameter to another data parameter associated with another application instance. Adjusting the cyclically varying load may include adjusting a frequency with which the load cyclically varies. Adjusting the frequency may include chirping the frequency to include multiple frequencies of interest, which may include a frequency associated with congestion, a frequency associated with memory leakage, and/or a frequency associated with application programming interface (API) call conflicts.

According to other examples, an application health monitoring server for monitoring application health in a datacenter may include a domain name server (DNS) modulation module and a processing module. The DNS modulation module may be configured to provide and adjust a cyclically varying load to an application instance at the datacenter to be processed by the application instance. The processing module may be configured to monitor application output data associated with the processing of the cyclically varying load by the application instance, determine a data parameter associated with the monitored application output data based on one of a difference or a comparison between parts of the cyclical load variation, cause the DNS modulation module to adjust the cyclically varying load based on the determined data parameter, and determine a health of the application instance based on the determined data parameter and the monitored application output data.

According to some embodiments, the DNS modulation module may be further configured to provide and adjust the cyclically varying load by causing a domain name server (DNS) resolver to redistribute application requests. The application output data may include a processing variation offset and/or a processing variation amplitude associated with the processing of the cyclically varying load by the application instance. The data parameter may include a rate of change of a memory usage associated with the application instance.

According to other embodiments, the DNS modulation module may be further configured to adjust the cyclically varying load by diverting load to or diverting load from another application instance. The processing module may be further configured to select the other application instance from multiple application instances using a round-robin or weighted round-robin selection process. The processing module may also be further configured to determine the health of the application instance by comparing the determined data parameter to a predefined threshold and/or shut down or restart the application instance in response to a determination that the data parameter does not meet the predefined threshold.

According to further embodiments, the processing module may also be further configured to determine the health of the application instance by comparing the determined data parameter to another data parameter associated with another application instance. The processing module may be further configured to adjust a frequency with which the load cyclically varies and/or chirp the frequency to include multiple frequencies of interest. The multiple frequencies of interest may include a frequency associated with congestion, a frequency associated with memory leakage, and/or a frequency associated with application programming interface (API) call conflicts.

According to further examples, a cloud-based datacenter configured to monitor application health in the datacenter may include at least one virtual machine (VM) operable to be executed on one or more physical machines and a datacenter controller. The datacenter controller may be configured to provide a cyclically varying load to an application instance executing on the at least one VM to be processed by the application instance, monitor application output data associated with the processing of the cyclically varying load by the application instance, determine a data parameter associated with the monitored application output data based on one of a difference or a comparison between parts of the cyclical load variation, adjust the cyclically varying load based on the determined data parameter, and determine a health of the application instance based on the determined data parameter and the monitored application output data.

According to some embodiments, the datacenter may further include a domain name server (DNS) resolver, and the datacenter controller may be further configured to provide and adjust the cyclically varying load by causing the DNS resolver to redistribute application requests. The application output data may include a processing variation offset and/or a processing variation amplitude associated with the processing of the cyclically varying load by the application instance. The data parameter may include a rate of change of a memory usage associated with the application instance.

According to other embodiments, the datacenter controller may be further configured to adjust the cyclically varying load by diverting load to or diverting load from another application instance being executed on the at least one VM and/or select the other application instance from multiple application instances at the datacenter using a round-robin or weighted round-robin selection process. The datacenter controller may also be further configured to determine the health of the application instance by comparing the determined data parameter to a predefined threshold and/or shut down or restart the application instance in response to a determination that the data parameter does not meet the predefined threshold.

According to further embodiments, the datacenter controller may also be further configured to determine the health of the application instance by comparing the determined data parameter to another data parameter associated with another application instance being executed on the at least one VM. The datacenter controller may be further configured to adjust a frequency with which the load cyclically varies and/or chirp the frequency to include multiple frequencies of interest. The multiple frequencies of interest may include a frequency associated with congestion, a frequency associated with memory leakage, and/or a frequency associated with application programming interface (API) call conflicts.

According to yet further examples, a computer readable storage medium may store instructions which, when executed on one or more computing devices, execute a method for monitoring application health in a datacenter. The instructions may include providing a cyclically varying load to an application instance to be processed by the application instance, monitoring application output data associated with the processing of the cyclically varying load by the application instance, determining a data parameter associated with the monitored application output data based on one of a difference or a comparison between parts of the cyclical load variation, adjusting the cyclically varying load based on the determined data parameter, and determining a health of the application instance based on the determined data parameter and the monitored application output data.

According to some embodiments, the instructions may further include providing and adjusting the cyclically varying load by redistributing application requests from a domain name server (DNS) resolver. The application output data may include a processing variation offset and/or a processing variation amplitude associated with the processing of the cyclically varying load by the application instance. The data parameter may include a rate of change of a memory usage associated with the application instance.

According to other embodiments, the instructions may further include adjusting the cyclically varying load by diverting load to or diverting load from another application instance and/or selecting the other application instance from multiple application instances using a round-robin or weighted round-robin selection process. The instructions may further include determining the health of the application instance by comparing the determined data parameter to a predefined threshold and/or shutting down or restarting the application instance in response to a determination that the data parameter does not meet the predefined threshold.

According to further embodiments, the instructions may further include determining the health of the application instance by comparing the determined data parameter to another data parameter associated with another application instance. Adjusting the cyclically varying load may include adjusting a frequency with which the load cyclically varies. Adjusting the frequency may include chirping the frequency to include multiple frequencies of interest, which may include a frequency associated with congestion, a frequency associated with memory leakage, and/or a frequency associated with application programming interface (API) call conflicts.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to monitor application health in a datacenter, the method comprising:
    selecting an application instance from a plurality of application instances using a weighted round-robin selection process, wherein the application instance is being executed on at least a physical server of the datacenter;
    providing a cyclical variation in load distribution to the application instance to be processed by the application instance, wherein the load distribution is determined by load balancing prior to the cyclical variation;
    receiving application output data, associated with processing of a cyclically varied load by the application instance, from one or more application sensors of the application instance, wherein the one or more application sensors provide modulated application output data associated with an operation of the application instance;
    monitoring the provided modulated application output data by tracking a switch pattern of the cyclically varied load to determine performance variations caused by the processing of the cyclically varied load;
    determining a data parameter associated with the monitored application output data based on a difference or a comparison between pans of the cyclically varied load, wherein the provided modulated application output data includes a processing variation offset and/or a processing variation amplitude associated with the operation of the application instance, and wherein the data parameter includes a rate of change of a memory usage associated with the application instance;
    determining a health of the application instance based on the determined data parameter and the monitored application output data; and
    adjusting a variation frequency of one or more components of the cyclically varied load in response to the determined health of the application instance, wherein the one or more components of the cyclically varied load include: the memory usage, a memory leakage, and an application program interface (API) call conflict.

2. The method of claim 1, further comprising adjusting the one or more components of the cyclically varied load based on the determined data parameter.

3. The method of claim 1, fluffier comprising providing and adjusting the cyclically varied load by redistributing application requests from a domain name system (DNS) resolver.

4. The method of claim 1, further comprising selecting another application instance from the plurality of application instances using one of a round-robin selection process or the weighted round-robin selection process.

5. The method of claim 1, wherein determining the health of the application instance comprises determining the health of the application by comparing the determined data parameter to a predefined threshold.

6. The method of claim 5, further comprising shutting down or restarting the application instance in response to a determination that the data parameter does not meet the predefined threshold.

7. The method of claim 1, wherein determining the health of the application instance comprises determining the health of the application by comparing the determined data parameter to another data parameter associated with another application instance.

8. The method of claim 1, further comprising adjusting the cyclically varied load by adjusting a frequency with which the load cyclically varies, wherein adjusting the frequency includes chirping the frequency to include a plurality of frequencies of interest.

9. An application health monitoring server to monitor application health in a datacenter, the server comprising:
    a memory implemented in one or more integrated circuits configured to store one or more instructions; and
    a processor implemented in an integrated circuit coupled to the memory, wherein the processor, in conjunction with the one or more instructions, is configured to:
        select an application instance from a plurality of application instances at the datacenter by use of a weighted round-robin selection process;
        provide and adjust a cyclical variation in load distribution to the application instance to be processed by the application instance, wherein the load distribution is determined by load balancing prior to the cyclical variation;
        receive application output data, associated with processing of a cyclically varied load by the application instance, from one or more application sensors of the application instance, wherein the one or more application sensors provide modulated application output data associated with an operation of the application instance;
        monitor the provided modulated application output data by tracking a switch pattern of the cyclically varied load to determine performance variations caused by the processing of the cyclically varied load;

determine a data parameter associated with the monitored application output data based on a difference or a comparison between parts of the cyclically varied load, wherein the provided modulated application output data includes a processing variation offset and/or a processing variation amplitude associated with the operation of the application instance, and wherein the data parameter includes a rate of chance of a memory usage associated with the application instance;

determine a health of the application instance based on the determined data parameter, the monitored application output data, and a comparison of the determined data parameter to a predefined threshold; and adjust a variation frequency of one or more components of the cyclically varied load in response to the determined health of the application instance, wherein the one or more components of the cyclically varied load include: the memory usage, a memory leakage, and an application program interface (API) call conflict.

10. The server of claim 9, wherein the processor is configured to adjust the cyclically varied load based on the determined data parameter.

11. The server of claim 9, wherein the processor is configured to provide and adjust the cyclically varied load by causing a domain name system (DNS) resolver to redistribute application requests.

12. The server of claim 9, wherein the processor is configured to adjust the cyclically varied load by one of diversion of load to or diversion of load from another application instance.

13. The server of claim 9, wherein the processor is configured to determine the health of the application instance by comparison of the determined data parameter to another data parameter associated with another application instance.

14. The server of claim 9, wherein the processor is configured to adjust a frequency with which the load cyclically varies by chirping the frequency to include a plurality of frequencies of interest.

15. A cloud-based datacenter configured to monitor application health in the datacenter, the datacenter comprising:
one or more physical servers configured to execute at least one virtual machine (VM), wherein the at least one VM executes an application instance, wherein the application instance is selected from a plurality of application instances by use of a weighted round-robin selection process, and wherein each of the one or more physical servers comprises:
a memory implemented in one or more integrated circuits; and
a processor implemented in an integrated circuit and coupled to the memory, wherein the processor is configured to:
provide a cyclical variation in load distribution to the application instance, which executes on the at least one VM, to be processed by the application instance, wherein the load distribution is determined by load balancing prior to the cyclical variation;

receive application output data, associated with processing of a cyclically varied load by the application instance, from one or more application sensors of the application instance, wherein the one or more application sensors provide modulated application output data associated with an operation of the application instance;

monitor the provided modulated application output data by tracking a switch pattern of the cyclically varied load to determine performance variations caused by the processing of the cyclically varied load;

determine a data parameter associated with the monitored application output data based on a difference or a comparison between parts of the cyclically varied load, wherein the provided modulated application output data includes a processing variation offset and/or a processing variation amplitude associated with the operation of the application instance, and wherein the data parameter includes a rate of change of a memory usage associated with the application instance;

determine a health of the application instance based on the determined data parameter and the monitored application output data; and adjust a variation frequency of one or more components of the cyclically varied load in response to the determined health of the application instance, wherein the one or more components of the cyclically varied load include: the memory usage, a memory leakage, and an application program interface (API) call conflict.

16. The datacenter of claim 15, wherein the processor is further configured to select another application instance from the plurality of application instances at the datacenter by use one of a round-robin selection process or the weighted round-robin selection process.

17. The datacenter of claim 15, wherein the processor is configured to determine the health of the application instance by comparison of the determined data parameter to a predefined threshold.

18. The datacenter of claim 17, wherein the processor is further configured to shut down or restart the application instance in response to a determination that the data parameter does not meet the predefined threshold.

19. The datacenter of claim 15, wherein the processor is configured to determine the health of the application instance by comparison of the determined data parameter to another data parameter associated with another application instance that is executed on the at least one VM.

20. The datacenter of claim 15, wherein the processor is configured to adjust a frequency with which the load cyclically varies.

* * * * *

UNITED STATES PATENT AND TRADEMARK OFFICE
CERTIFICATE OF CORRECTION

| | |
|---|---|
| PATENT NO. | : 9,699,058 B2 |
| APPLICATION NO. | : 14/238457 |
| DATED | : July 4, 2017 |
| INVENTOR(S) | : Kruglick |

It is certified that error appears in the above-identified patent and that said Letters Patent is hereby corrected as shown below:

In the Specification

In Column 8, Line 48, delete "type including" and insert -- type, including --, therefor.

In Column 16, Line 58, delete "of"two recitations,"" and insert -- of "two recitations," --, therefor.

In Column 16, Line 65, delete "of A. B," and insert -- of A, B, --, therefor.

In Column 17, Line 21, delete ""less than."" and insert -- "less than," --, therefor.

In the Claims

In Column 17, Line 61, in Claim 1, delete "between pans of" and insert -- between parts of --, therefor.

In Column 19, Line 8, in Claim 9, delete "of chance" and insert -- of change --, therefor.

In Column 20, Line 36, in Claim 9, delete "(APl)" and insert -- (API) --, therefor.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*